US012564743B2

(12) United States Patent
King et al.

(10) Patent No.: US 12,564,743 B2
(45) Date of Patent: Mar. 3, 2026

(54) SELF-RETRACTING LIFELINE SYSTEM

(71) Applicant: WERNER CO., Itasca, IL (US)

(72) Inventors: Kendal King, Mars, PA (US); Tracee Leonardson, Ashtabula, OH (US); Cody Rappoport, Greenville, PA (US)

(73) Assignee: Werner Co., Itasca, IL (US)

( * ) Notice: Subject to any disclaimer, the term of this patent is extended or adjusted under 35 U.S.C. 154(b) by 482 days.

(21) Appl. No.: 18/106,003

(22) Filed: Feb. 6, 2023

(65) Prior Publication Data

US 2023/0256273 A1 Aug. 17, 2023

Related U.S. Application Data

(60) Provisional application No. 63/309,813, filed on Feb. 14, 2022, provisional application No. 63/309,807, filed on Feb. 14, 2022.

(51) Int. Cl.

*A62B 35/00* (2006.01)
*A62B 35/04* (2006.01)

(52) U.S. Cl.

CPC ...... *A62B 35/0037* (2013.01); *A62B 35/0018* (2013.01); *A62B 35/0093* (2013.01); *A62B 35/04* (2013.01)

(58) Field of Classification Search

CPC ............ A62B 35/0025; A62B 35/0037; A62B 35/0075; A62B 35/0093; A62B 35/04

See application file for complete search history.

(56) References Cited

U.S. PATENT DOCUMENTS 2,680,593 A * 6/1954 Mcintyre ................. A62B 1/10 182/7
4,877,110 A * 10/1989 Wolner .............. A62B 35/0093 D29/124
6,533,066 B1 * 3/2003 O'Dell ................. D03D 1/0005 182/4
8,177,025 B2 5/2012 Lang et al.
8,181,744 B2 * 5/2012 Parker ....................... A62B 1/10 182/232

(Continued)

FOREIGN PATENT DOCUMENTS

CN 1993158 A 7/2007
EP 2488258 A1 8/2012

(Continued)

OTHER PUBLICATIONS

Taiwan Intellectual Property Office "Office Action with Search Report" for corresponding Taiwan Patent Application No. 112105008, dated Oct. 16, 2023, 7 pp. (translated English language Search Report also attached).

(Continued)

*Primary Examiner* — Robert Canfield

(74) *Attorney, Agent, or Firm* — Michael Best & Friedrich LLP

(57) ABSTRACT

A self-retracting lifeline system including a self-retracting lifeline including a retracting device and webbing extending from the retracting device, and a backpack energy absorber configured to attach to a harness at a back of a user wearing the harness, wherein the webbing includes a first end attached to the retracting device and a second end attached to the backpack energy absorber.

16 Claims, 15 Drawing Sheets

(56) References Cited

U.S. PATENT DOCUMENTS

| | | | | | |
|---|---|---|---|---|---|
| 8,490,750 | B2 * | 7/2013 | Balquist | A62B 35/0093 | 182/236 |
| 8,584,799 | B1 * | 11/2013 | Dennington | A62B 35/04 | 182/4 |
| 8,746,739 | B2 * | 6/2014 | Meggs | A62B 35/0075 | 104/93 |
| 9,121,462 | B2 * | 9/2015 | Casebolt | A62B 1/10 | |
| 9,174,073 | B2 * | 11/2015 | Casebolt | A62B 35/0025 | |
| 9,199,103 | B2 | 12/2015 | Hetrich et al. | | |
| 9,427,607 | B2 | 8/2016 | Renton et al. | | |
| 9,707,421 | B2 * | 7/2017 | Casebolt | F16F 7/006 | |
| 9,993,669 | B2 | 6/2018 | Casebolt et al. | | |
| 10,232,199 | B2 * | 3/2019 | Perner | A62B 35/0037 | |
| 10,258,814 | B2 * | 4/2019 | Casebolt | A45F 5/02 | |
| 10,322,305 | B2 * | 6/2019 | Balquist | A62B 35/04 | |
| 10,343,001 | B2 | 7/2019 | Seman | | |
| 10,456,609 | B2 * | 10/2019 | Yang | A62B 35/0075 | |
| 10,485,998 | B2 * | 11/2019 | Jones | A62B 35/0018 | |
| 10,688,323 | B2 | 6/2020 | Wolner et al. | | |
| 11,633,634 | B2 * | 4/2023 | Harding | A62B 35/0018 | 702/41 |
| 11,638,843 | B2 * | 5/2023 | Jones | A62B 35/0093 | 182/231 |
| 11,779,783 | B2 | 10/2023 | Schrank | | |
| 12,005,276 | B2 * | 6/2024 | Casebolt | A62B 35/0093 | |
| 2005/0269153 | A1 * | 12/2005 | Casebolt | A62B 35/0093 | 182/3 |
| 2006/0048723 | A1 * | 3/2006 | Rohlf | A62B 35/04 | 119/857 |
| 2007/0215410 | A1 * | 9/2007 | Ecker | A62B 35/0093 | 182/192 |
| 2009/0173578 | A1 * | 7/2009 | Renton | A62B 1/08 | 182/5 |
| 2009/0211847 | A1 * | 8/2009 | Balquist | A62B 35/0093 | 182/231 |
| 2013/0298354 | A1 * | 11/2013 | Campbell | B60R 22/024 | 24/191 |
| 2014/0224580 | A1 * | 8/2014 | Casebolt | F16F 7/006 | 188/376 |
| 2014/0331459 | A1 * | 11/2014 | Fink | A62B 35/0037 | 24/302 |
| 2016/0107007 | A1 * | 4/2016 | Pollard | A62B 35/0075 | 182/3 |
| 2016/0220857 | A1 * | 8/2016 | Rappoport | A62B 35/0075 | |
| 2016/0361578 | A1 * | 12/2016 | Casebolt | A62B 35/0075 | |
| 2018/0147428 | A1 * | 5/2018 | Balquist | A62B 35/0093 | |
| 2020/0155879 | A1 * | 5/2020 | Chang | A62B 35/0037 | |
| 2021/0016115 | A1 * | 1/2021 | Bhaskarwar | A62B 35/0025 | |
| 2022/0362594 | A1 * | 11/2022 | Coyle | A62B 35/0093 | |
| 2023/0302308 | A1 * | 9/2023 | Andrade | A62B 35/0018 | |
| 2023/0330456 | A1 * | 10/2023 | Aleksovski | A62B 35/0025 | |
| 2024/0350840 | A1 * | 10/2024 | Squire | A62B 35/04 | |

FOREIGN PATENT DOCUMENTS

| | | | | |
|---|---|---|---|---|
| GB | 2374552 | A * | 10/2002 | A62B 35/0093 |
| WO | WO-2009108627 | A1 * | 9/2009 | A62B 35/0093 |
| WO | 2011/027109 | A1 | 3/2011 | |
| WO | 2021/084395 | A1 | 5/2021 | |

OTHER PUBLICATIONS

European Patent Office "Partial European Search Report" for corresponding European Patent Application No. 23156102.8, dated Jul. 13, 2023, 11 pp.

Taiwan Intellectual Property Office "Office Action and Search Report" for corresponding Taiwan Patent Application No. 112105008, dated Feb. 11, 2025, 8 pp.

* cited by examiner

SELF-RETRACTING LIFELINE SYSTEM

CROSS REFERENCE TO RELATED APPLICATIONS

This application claims priority to U.S. Provisional Patent Application Ser. No. 63/309,807, filed Feb. 14, 2022, entitled SELF-RETRACTING LIFELINE, and also claims priority to U.S. Provisional Patent Application Ser. No. 63/309,813, filed Feb. 14, 2022, entitled SELF-RETRACTING LIFELINE, both of which are incorporated in their entirety herein by reference.

FIELD OF THE INVENTION

The disclosed concept relates generally to fall protection systems, and in particular, to a self-retracting lifeline system for a fall protection systems.

BACKGROUND OF THE INVENTION

In fall protection systems, a worker typically wears a harness. The harness is generally attached to an attachment point via a lifeline. One type of lifeline is referred to as a self-retracting lifeline. A self-retracting lifeline includes a device configured to automatically retract the lifeline into its housing, thus pulling in any excess slack or length of the lifeline.

In some applications, the self-retracting lifeline device is attached to a metal ring on the back of the harness. The lifeline is then pulled out of the device and attached to the attachment point, with the device remaining on the back of the harness. This type of arrangement can present issues such as the ring or self-retracting lifeline device striking the user in the head in the event of a fall.

There is thus room for improvement in self-retracting lifeline systems.

SUMMARY OF THE INVENTION

In accordance with an aspect of the disclosed concept, a self-retracting lifeline system comprises: a self-retracting lifeline including a retracting device and webbing extending from the retracting device; and a backpack energy absorber configured to attach to a harness at a back of a user wearing the harness, wherein the webbing includes a first end attached to the retracting device and a second end attached to the backpack energy absorber.

In accordance with an aspect of the disclosed concept, a self-retracting lifeline system comprises: a self-retracting lifeline including a retracting device and webbing extending from the retracting device, wherein the webbing includes a first end attached to the retracting device and a second end configured to couple to a harness at a back of a user wearing the harness, and wherein the webbing has a length sufficient such that the retracting device is configured to reach a hip of the user while the webbing is coupled to the harness.

In accordance with an aspect of the disclosed concept, a self-retracting lifeline system comprises: a harness configured to be worn by a user; a self-retracting lifeline including a retracting device and webbing extending from the retracting device; and a backpack energy absorber attached to a back of the harness, wherein the webbing includes a first end attached to the retracting device and a second end attached to the backpack energy absorber.

BRIEF DESCRIPTION OF THE DRAWINGS

A full understanding of the invention can be gained from the following description of the preferred embodiments when read in conjunction with the accompanying drawings in which:

FIG. 5D is a detail view of

DETAILED DESCRIPTION OF THE INVENTION

As used herein, the term "self-retracting lifeline system" refers to a self-retracting lifeline or a self-retracting lifeline and any combination of components used in conjunction with the self-retracting lifeline. For example, a self-retracting lifeline may be referred to as a self-retracting lifeline system. Additionally, a self-retracting lifeline in combination with additional components such as a harness and/or backpack energy absorber may be referred to as a self-retracting lifeline system.

Figure 1:
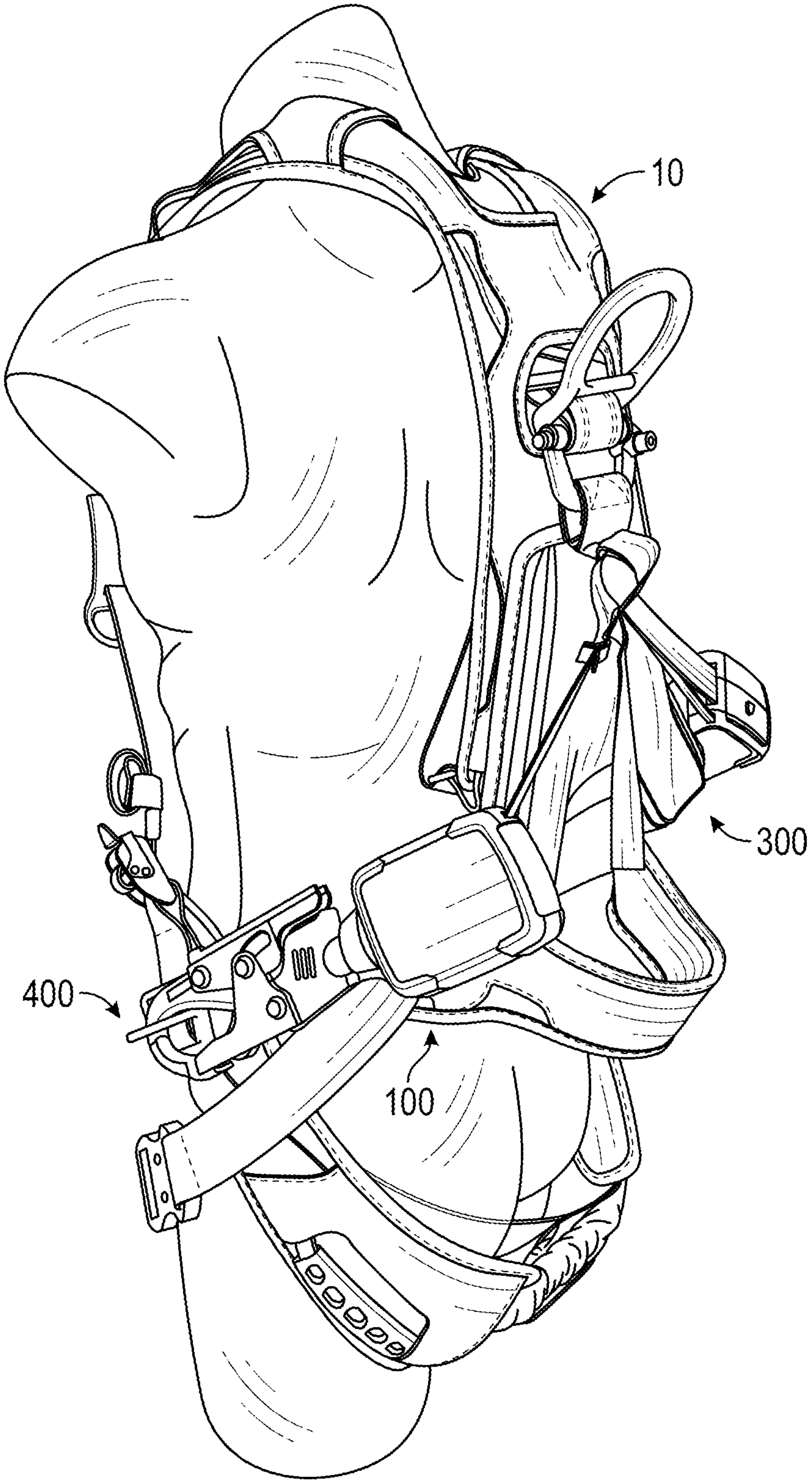
FIG. 1 is an angled rear-view of a harness including a self-retracting lifeline in accordance with an example embodiment of the disclosed concept.
Figure 2:
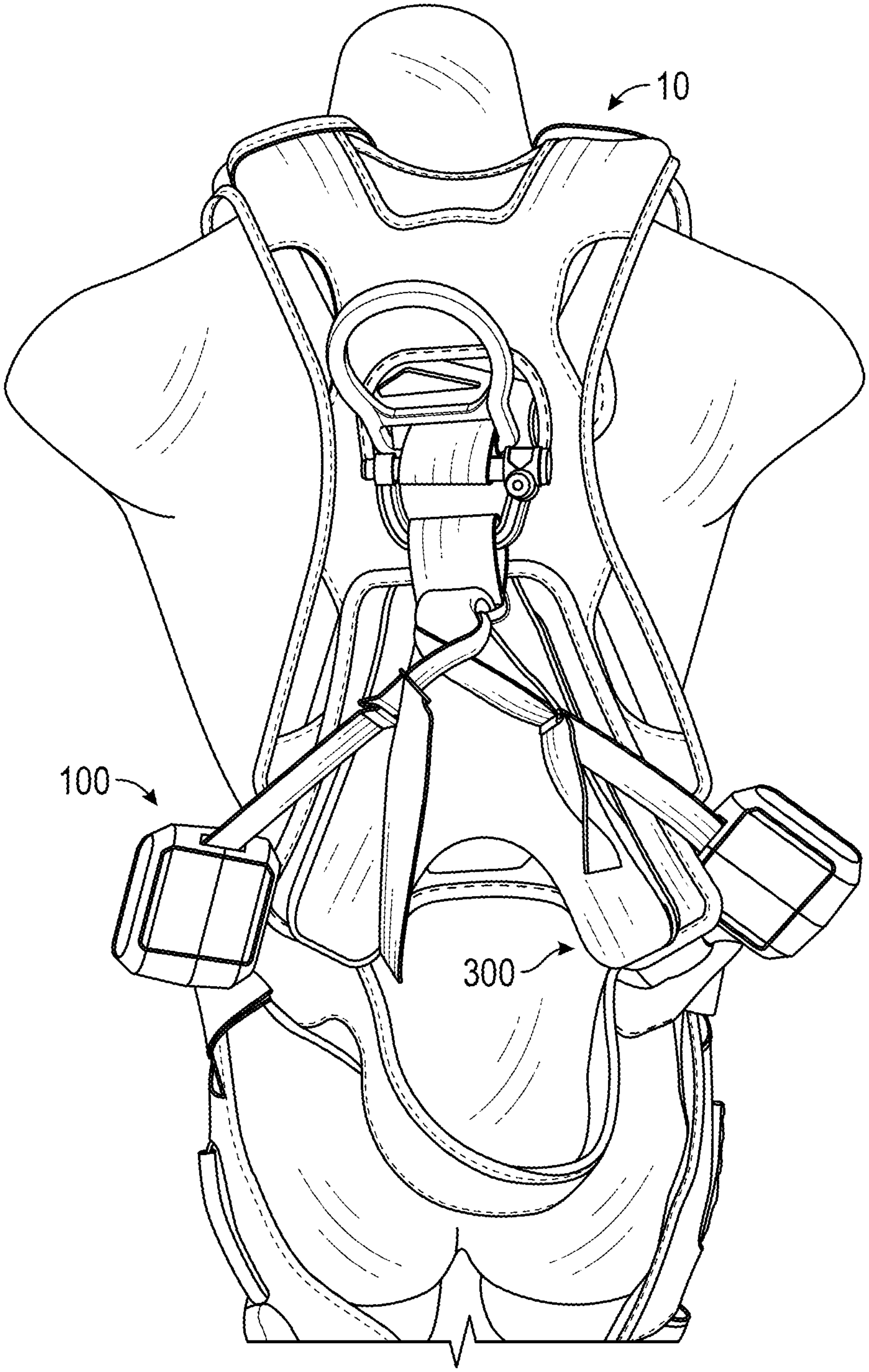
FIG. 2 is a rear view of a harness including a self-retracting lifeline in accordance with an example embodiment of the disclosed concept.

FIG. 1 is an angled rear-view of a harness 10 including a self-retracting lifeline 100 in accordance with an example embodiment of the disclosed concept. FIG. 2 is a rear view of the harness 10 of FIG. 1. The harness 10 is for use in fall protection applications and is configured to be worn by a user. The harness 10 includes various straps, such as shoulder, leg, and chest straps, for example. The straps are operative to secure the harness 10 to a user. The straps may be formed from webbing or other types of materials. The harness 10 further includes an attachment point on the back of the harness 10. A backpack energy absorber 300 is attached to the harness 10 at the attachment point. The self-retracting lifeline 100 is attached to the backpack energy absorber 300. In the example shown in FIGS. 1 and 2, the self-retracting lifeline 100 is attached to the backpack energy absorber 300 via sewn webbing so as to create a more permanent attachment. However, it will be appreciated that other types of attachments between the self-retracting lifeline 100 and the backpack energy absorber 300 may be employed, such as, for example and without limitation, a connection mechanism such as a releasable metal connector.

In the example embodiment shown in FIGS. 1 and 2, dual self-retracting lifelines 100 are attached to the backpack energy absorber 300. However, it will be appreciated that in some example embodiments, a single self-retracting lifeline 100 may be attached to the backpack energy absorber 300. Further, in some example embodiments, the backpack energy absorber 300 may be omitted and replaced with a different type of energy absorber such as, for example and without limitation, an in-line energy absorber. Some example embodiments of the self-retracting lifeline 100 and backpack energy absorber 300 will be described in more detail herein.

In the example embodiment shown in FIG. 1, a breakaway accessory keeper 400 is attached to the harness 10. The breakaway accessory keeper 400 may be selectively attached to webbing of the harness 10. The breakaway accessory keeper 400 includes a loop that one or more accessories may be attached to. For example, the self-retracting lifeline 100 may be attached to the breakaway accessory keeper 400 when the self-retracting lifeline 100 is not in use. In this manner, the distal end of the self-retracting lifeline 100 is secured, reducing the chance for it to become snagged or risk striking and injuring the user or others. In some example embodiments, the breakaway accessory keeper 400 is structured to release the secured accessory under a sufficient level of force. Some example embodiments of the breakaway accessory keeper 400 will be described in more detail herein.

It will be appreciated that the harness 10 shown in FIGS. 1 and 2 is one example embodiment of a harness according to the disclosed concept. Other types and styles of harnesses may be employed without departing from the scope of the disclosed concept. Some example embodiments of the self-retracting lifeline 100, the backpack energy absorber 300, and breakaway accessory keeper 400 will now be described in more detail. It will be appreciated that one or more of these components may be omitted, or used in various combinations without departing from the scope of the disclosed concept.

Figure 3:
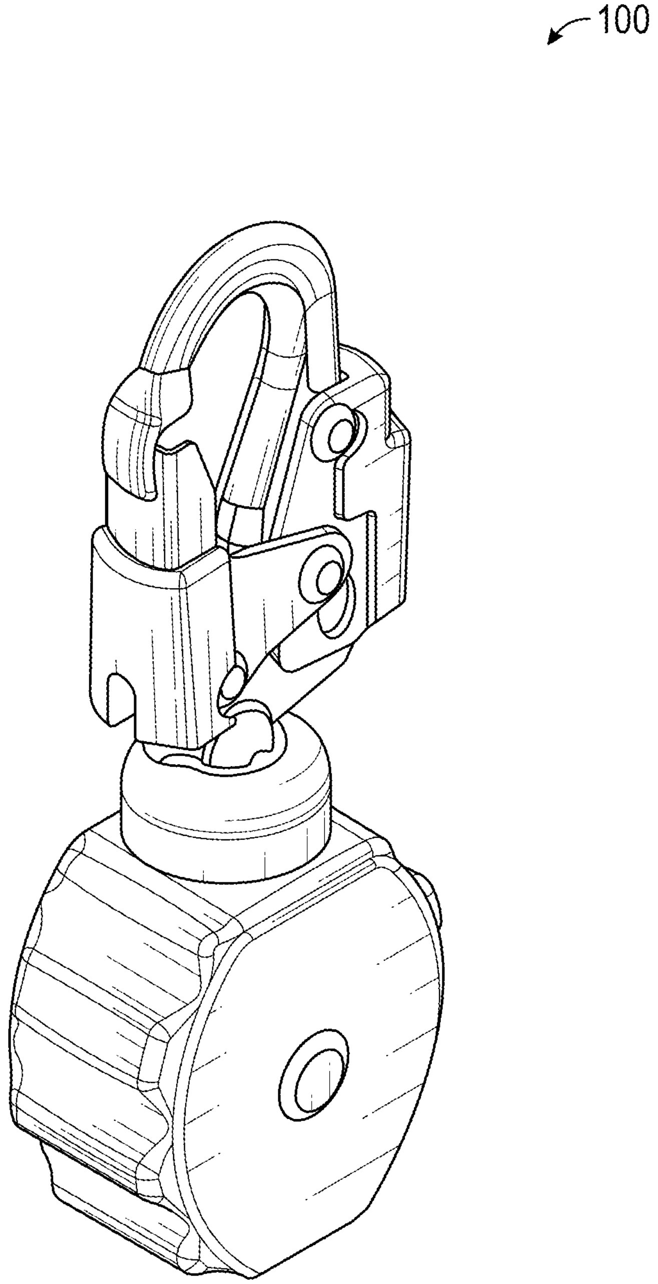
FIG. 3 is a view of a self-retracting lifeline in accordance with an example embodiment of the disclosed concept.
Figure 4:
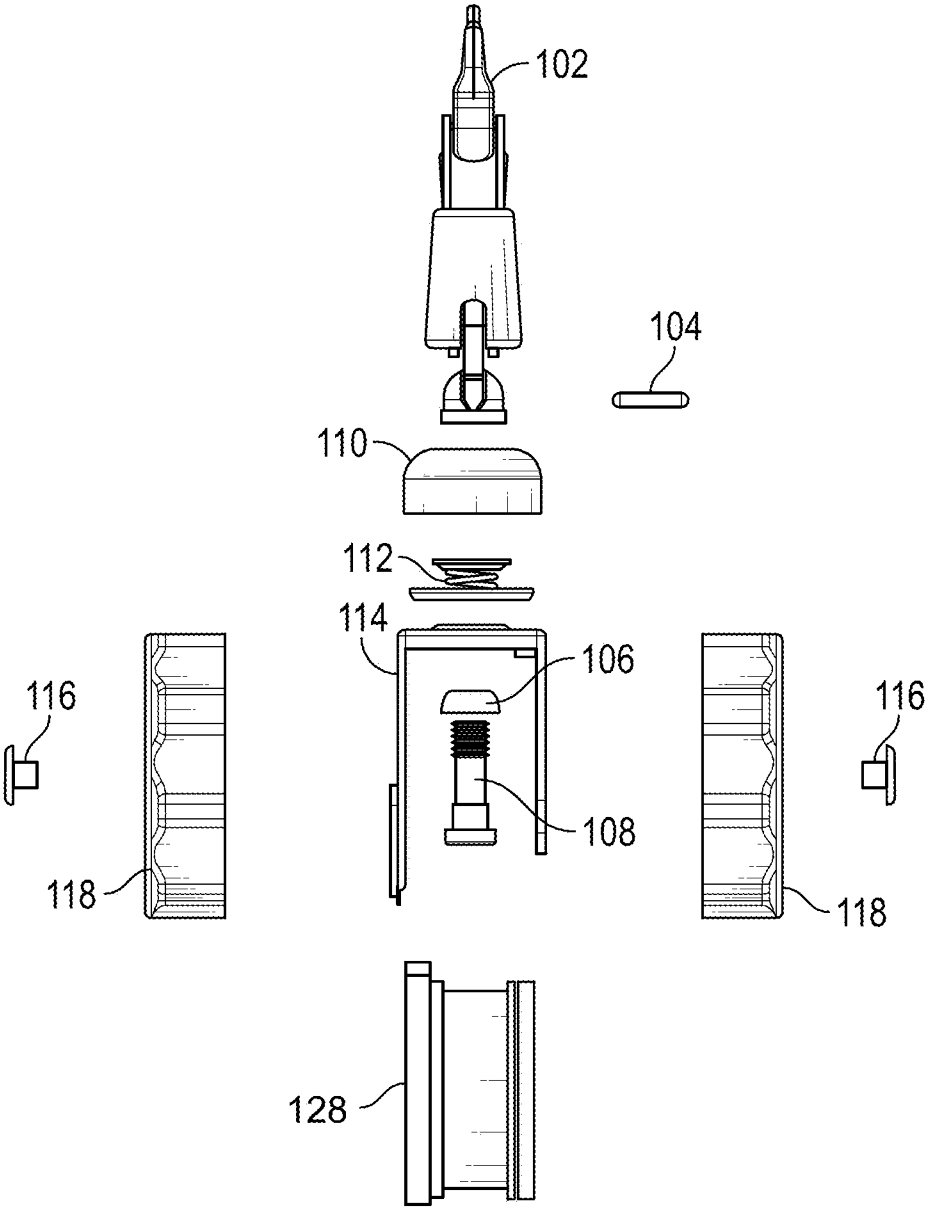
FIG. 4 is an exploded view of the self-retracting lifeline of FIG. 3.
Figure 5A:
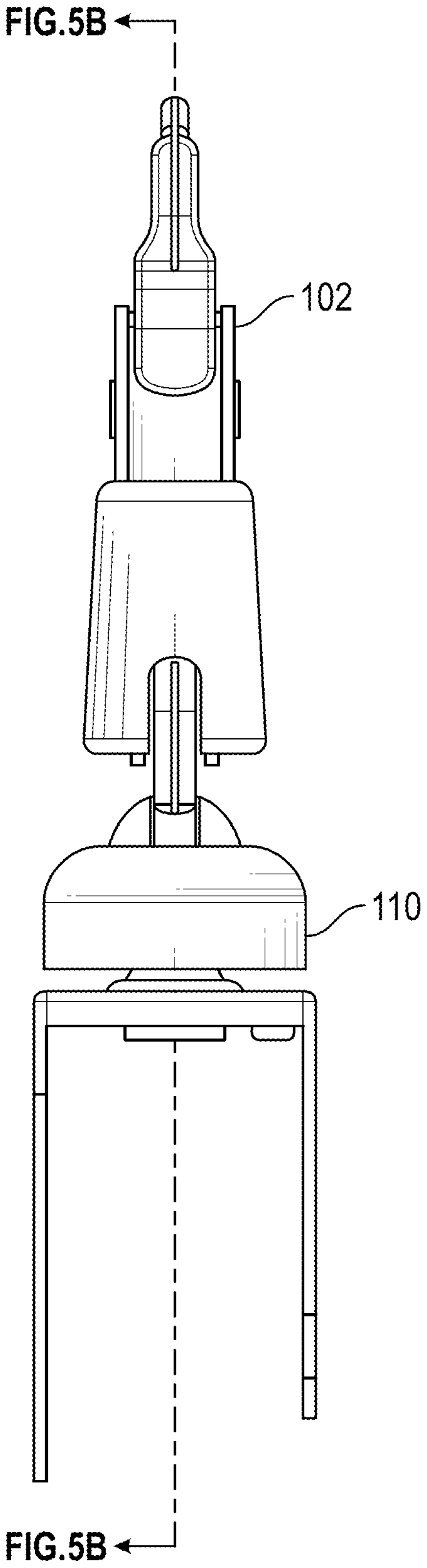
FIG. 5A is a side view of a portion of the self-retracting lifeline of FIG. 3.
Figure 5B:
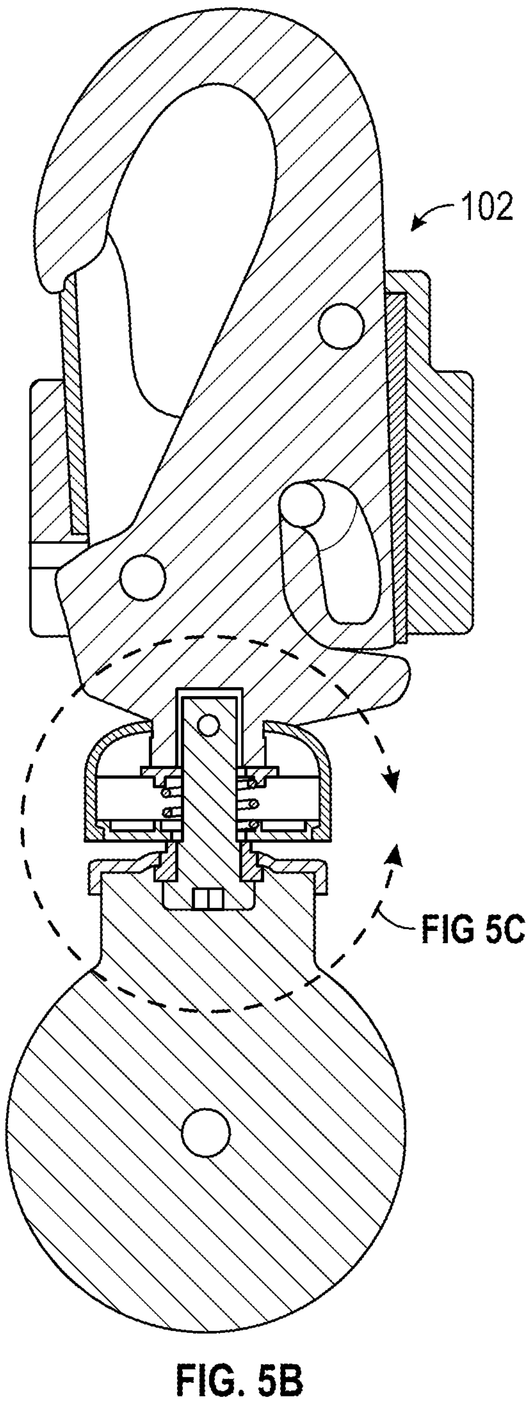
FIG. 5B is a cross-section view of the self-retracting lifeline of FIG. 5A.
Figure 5C:
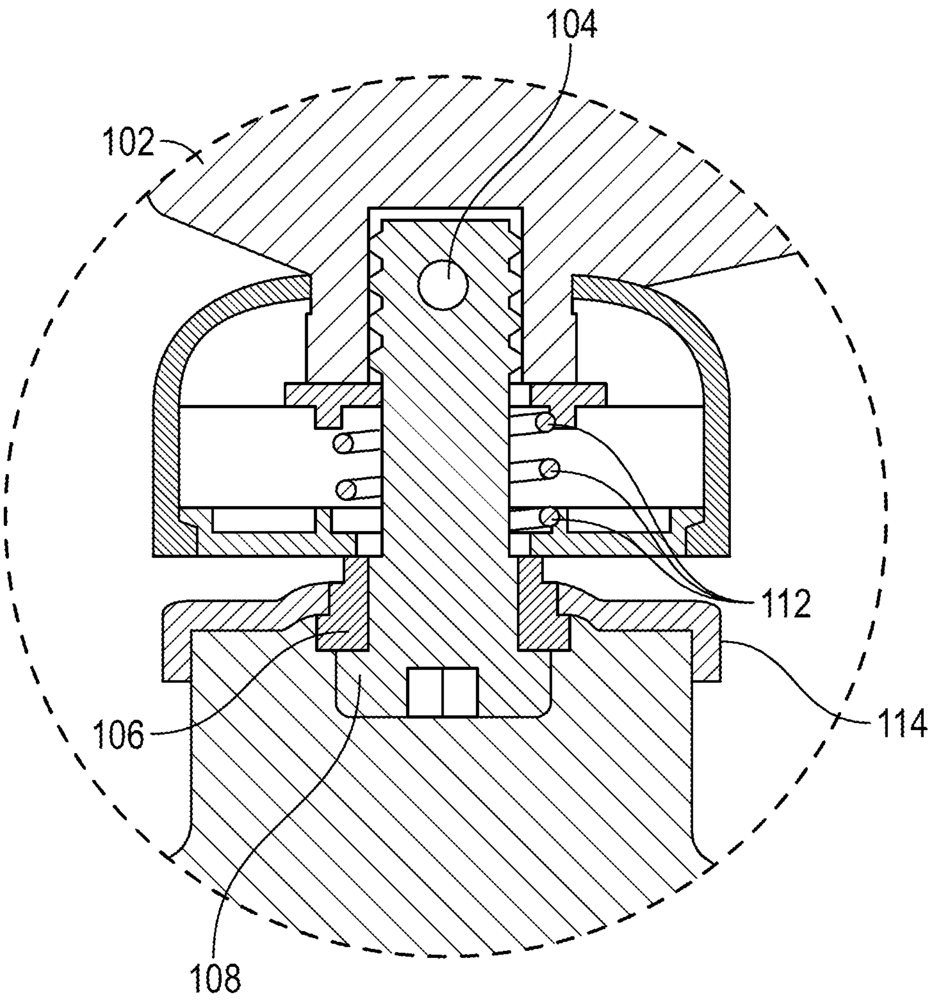
FIG. 5C is a detail view of the self-retracting lifeline of FIG. 5B.

FIG. 3 is a view of a self-retracting lifeline 100 in accordance with an example embodiment of the disclosed concept. FIGS. 4-6 are addition views of the self-retracting lifeline 100.

The self-retracting lifeline 100 is configured to attach to an anchor, or other attachment point and to house a length of lifeline. The self-retracting lifeline 100 is configured to automatically retract unused length of the lifeline within the housing. The self-retracting lifeline 100 includes an attachment hook assembly 102 configured to selectively attach to the attachment point. For example, when the self-retracting lifeline 100 is not in use, the attachment hook assembly 102 may be attached to the breakaway accessory keeper 400 as shown in FIG. 1. When the self-retracting lifeline 100 is in use, the attachment hook assembly 102 may be attached to an anchor point, such as, for example, a ring anchored to a structure or a horizontal lifeline anchored to a structure. The self-retracting lifeline 100 further includes an attachment arrangement including a frame 114 and a screw 108, ball end 106, spring assembly 112, cover 110, and pin 104 configured to attach the frame 114 to the attachment hook assembly 102, as shown in FIG. 5C.

This attachment arrangement is provided to allow the attachment hook assembly 102 to have angular and rotational flexibility, as is shown in FIG. 6. This type of attachment arrangement may be referred to as a ball and socket type joint. The flexibility allows the frame 114 to move angularly and rotationally with respect to the attachment hook assembly 102. This allows flexibility of the frame 114 with respect to the attachment or anchor point that the attachment hook assembly 102 is attached to. For example, when the attachment hook assembly 102 is attached to a fixed anchor point, the flexibility allows the frame 114 to point toward the user to a degree such that the lifeline is pulled into or out of the device more directly when the user is disposed at an angle with respect to the fixed anchor point. In some example embodiments, the frame 114 is able to move at an angle of up to 20 degrees with respect to the attachment hook assembly 102.

Figure 5D:
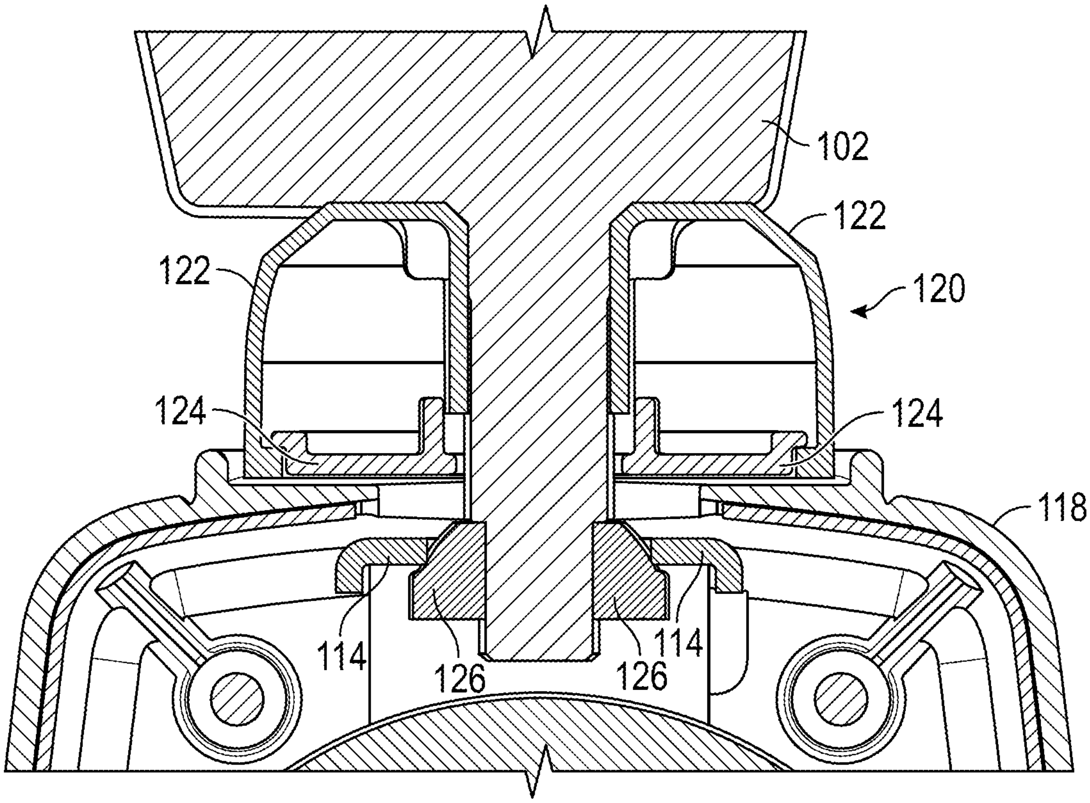
Figure 6:
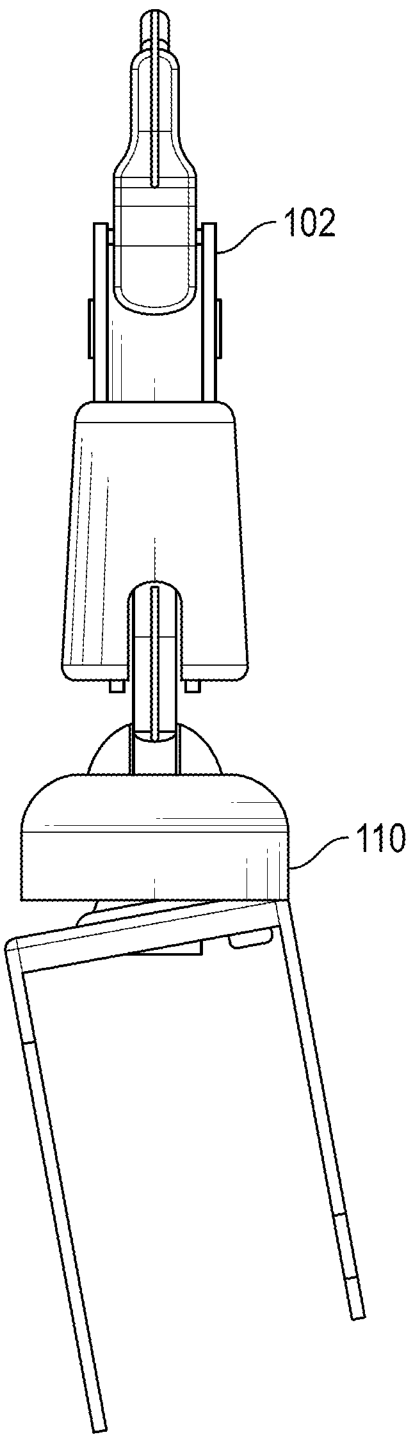
FIG. 6 is a view of the anchor hook of the self-retracting lifeline of FIG. 3.

FIG. 5D shows an attachment arrangement in accordance with another example embodiment of the disclosed concept. The attachment arrangement similarly allows the attachment hook assembly 102 to have angular and rotational flexibility. The attachment arrangement of FIG. 5D includes a cover 120 including a cover body 122 and cover base 124. The cover 120 may be composed of a flexible rubber material that acts as a spring that provides some resistance to angular movement of the attachment hook assembly 102 and tends to return the attachment hook assembly 102 to a neutral position when the attachment hook assembly 102 is not under force in an angular direction. In the embodiment shown in FIG. 5D, the attachment hook assembly 102 extends through the cover 120 into the frame 114, similar to a shoulder rivet. The attachment arrangement also include a ball end 126 located proximate the frame 114, which facilitates angular movement of the attachment hook assembly 102.

The self-retracting lifeline 100 further includes housing sections 118 secured by rivets 116 to form a housing. A retracting device 128 is included and is configured to automatically retract the lifeline. The retracting device 128 may also include a braking mechanism structured to stop the lifeline from being pulled further out of the housing in the event of a fall. It will be appreciated that various styles and types of retracting devices may be employed without departing from the scope of the disclosed concept.

Figure 7:
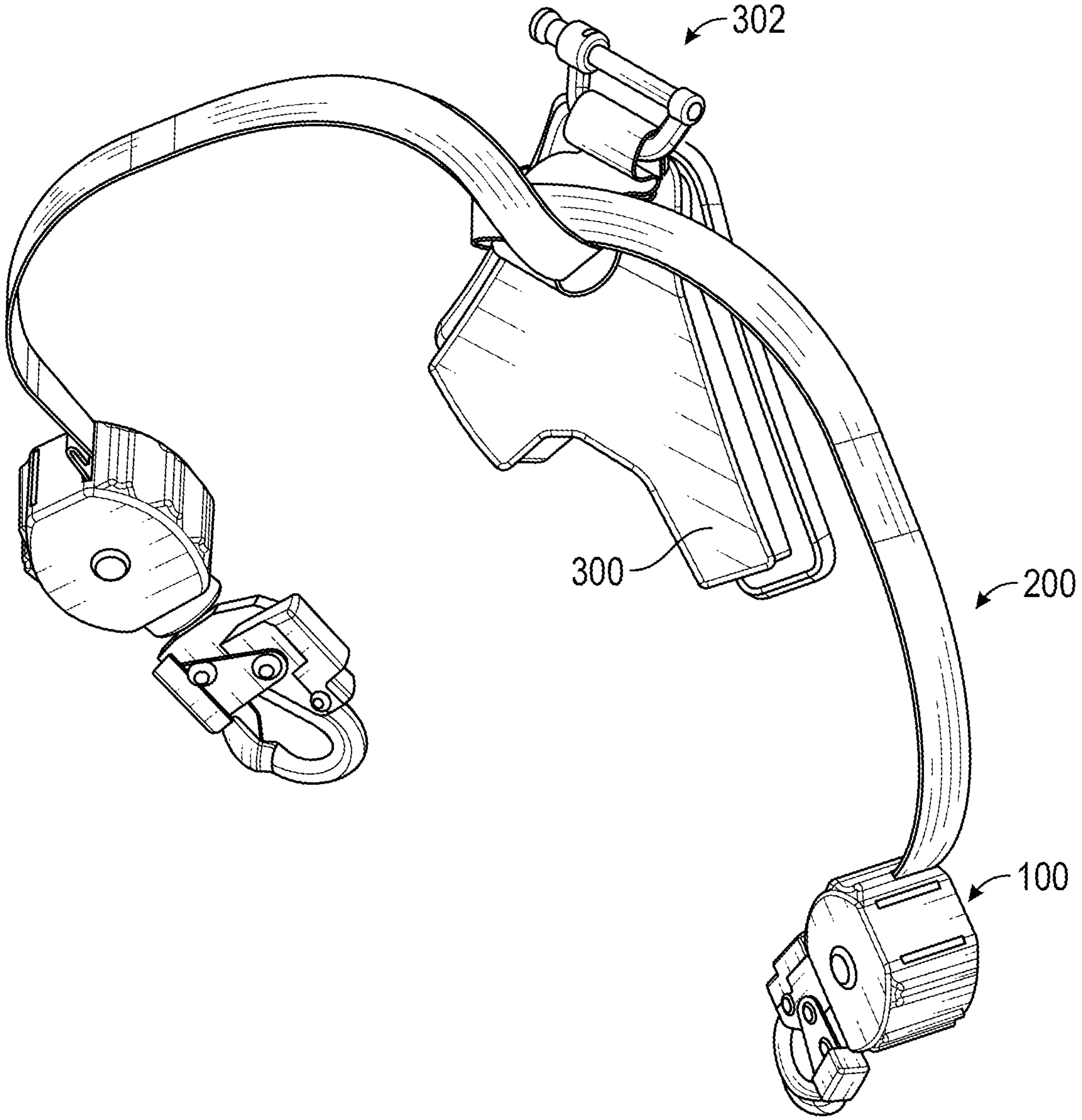
FIG. 7 is a view of a self-retracting lifeline system in accordance with an example embodiment of the disclosed concept.
Figure 8:
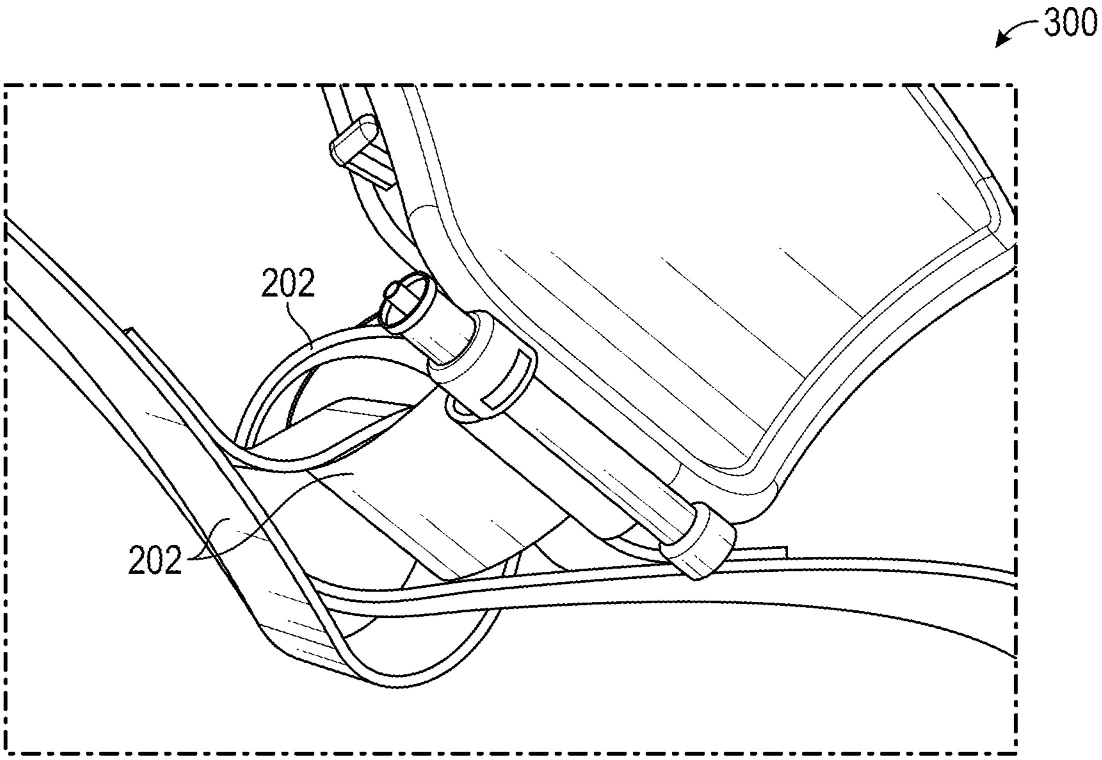
FIG. 8 is a section view of the self-retracting lifeline system of FIG. 7.
Figure 9:
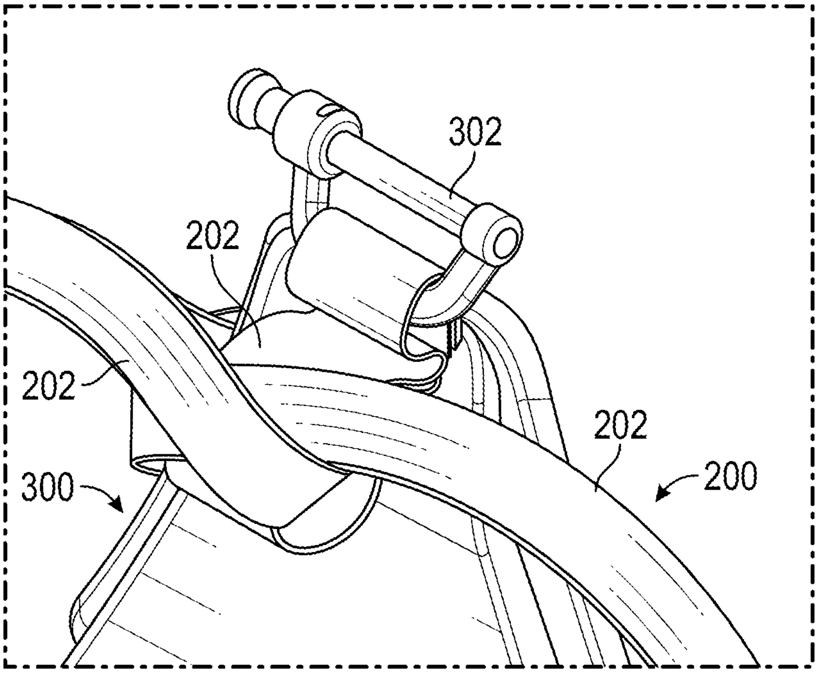
FIG. 9 is a detail view of the self-retracting lifeline system of FIG. 7.

FIG. 7 is a view of a self-retracting lifeline system in accordance with an example embodiment of the disclosed concept, and FIGS. 8-9 are additional views of the self-retracting lifeline system. In some example embodiments, the self-retracting lifeline system includes the self-retracting lifeline 100 of FIGS. 3-5. However, it will be appreciated that the self-retracting lifeline system can be used with other self-retracting lifelines as well. The self-retracting lifeline system includes webbing 200, extending from the self-retracting lifeline 100 from a side opposite of where the lifeline is retracted into or out of the self-retracting lifeline 100, and a backpack energy absorber 300. The backpack energy absorber 300 is configured to be attached to a harness via a connector 302. For example, to the attachment point of the harness 10 shown in FIGS. 1 and 2. In some example embodiments, the webbing 200 has a length sufficient that the portion of the self-retracting lifeline 100 including the retraction device reaches the hip of the user. This length of webbing 200 allows the self-retracting lifeline 100 to be attached to the harness at the hip of the user when the self-retracting lifeline 100 is not in use. Also, when the self-retracting lifeline 100 is in use, the length of webbing 200 distances the housing of the self-retracting lifeline 100 from the user's head, thus reducing the possibility of the self-retracting lifeline 100 housing striking the user's head in the case of a fall.

In an example embodiment, stitched loops 202 connect the webbing 200 extending from the self-retracting lifeline 100 to the backpack energy absorber 300. The stitched loops 202 are formed by sewing different portions of the webbing 200 together to create loops that pass through an attachment loop of the backpack energy absorber 300. The attachment using stitched loops 202 creates a more permanent attachment between the self-retracting lifeline 100 and the backpack energy absorber 300. It will be appreciated, however, that other types of connections between the self-retracting lifeline 100 and the backpack energy absorber 300 may be employed. For example and without limitation, a releasable connection, such as a releasable hook or other type of connector may be used to attach the self-retracting lifeline 100 to the backpack energy absorber 300.

The backpack energy absorber 300 is structured to attach to the back of a user, and for example, to the back of a harness worn by the user, such as is shown in FIGS. 1 and 2. The backpack energy absorber 300 is structured to operate as an energy absorber. For example and without limitation, the backpack energy absorber 300 may include a length of stitched webbing that is structured to tear under sufficient force, such as in the event of a fall, to slow and absorb the energy of the fall and lessen the sudden impact force of arresting the fall.

In the self-retracting lifeline system, when the self-retracting lifeline 100 is in use, the retracting device is spaced from the attachment point on the user's back. In other self-retracting lifeline systems where the retracting device is at the attachment point on the user's back, there is a risk during a fall that the retracting device will hit the user's head. In accordance with example embodiments of this disclosed concept, that risk is avoided. When the self-retracting lifeline 100 is not in use, in some example embodiments, the retracting device is attached at an accessory attachment point on the harness. In some example embodiment, the accessory attachment point is on the hip of the user. Storing the retracting device on the user's back can be uncomfortable and affect balance, and by storing the retracting device on the hip when not in use, this discomfort is avoided and better balance is provided. In some example embodiments, the accessory attachment point may be a breakaway attachment point, which will breakaway under sufficient force to avoid snags.

In the example embodiment shown in FIGS. 7-9, the self-retracting lifeline system includes two self-retracting lifelines 100 attached to the backpack energy absorber 300 via 3-way stitched loops 202. However, it will be appreciated that the disclosed concept is also applicable to self-retracting lifeline systems having a different number of self-retracting lifelines 100. For example, the disclosed concept may be employed with a single self-retracting lifeline. Additionally, as discussed above, the self-retracting lifeline 100 and backpack energy absorber 300 may be attached using mechanisms other that the stitched loops 202 without departing from the scope of the disclosed concept.

Figure 10:
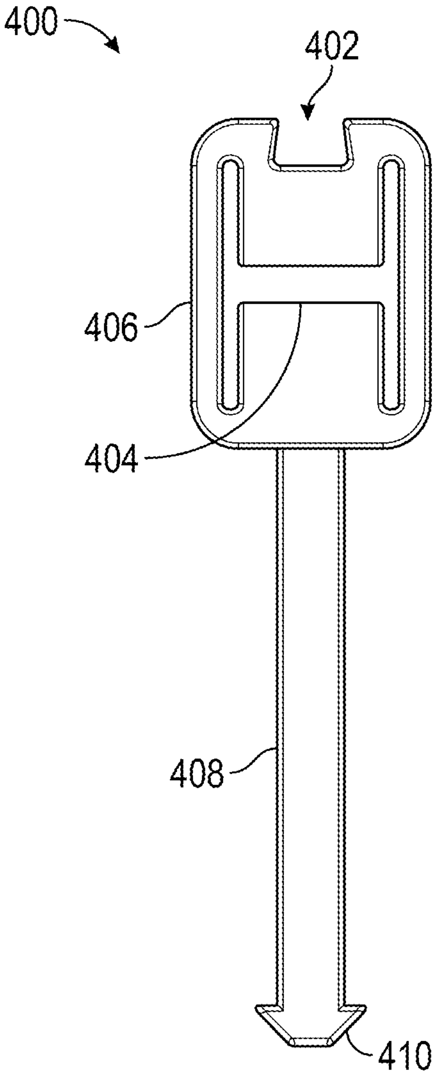
FIG. 10 is a front view of a breakaway accessory keeper in accordance with an example embodiment of the disclosed concept.
Figure 11:
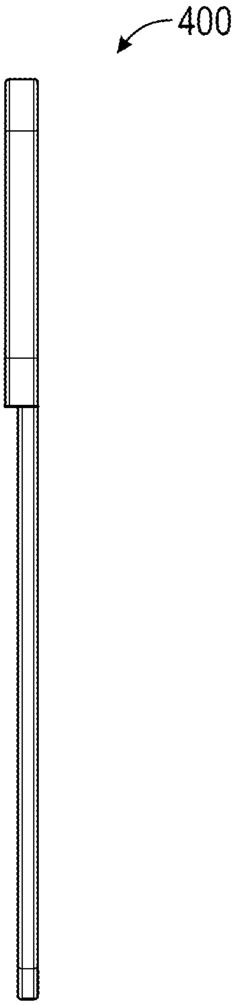
FIG. 11 is a side view of the breakaway accessory keeper of FIG. 10.
Figure 12:
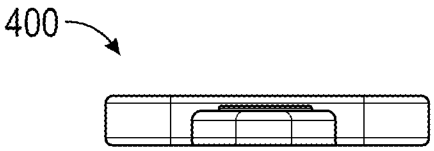
FIG. 12 is an end view of the breakaway accessory keeper of FIG. 10.
Figure 13:
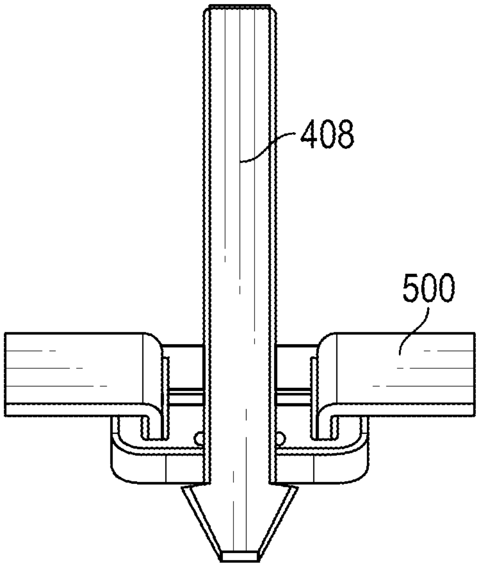
FIGS. 13-15 are views of the breakaway accessory keeper of FIG. 10 attached to webbing.

FIG. 10 is a front view of a breakaway accessory keeper 400 in accordance with an example embodiment of the disclosed concept, and FIGS. 9 and 10 are side and end views of the breakaway accessory keeper 400. FIGS. 11-13 are views of the breakaway accessory keeper 400 in use with webbing 500. The breakaway accessory keeper 400 includes a notch 402, an H-shaped slotted opening 404, a base 406, a loop 408, and a hook 410.

The H-shaped slotted opening 404 is formed in the base 406 and allows the breakaway accessory keeper 400 to be attached at any point on webbing of a harness, as well as released and re-attached at another point. As shown in FIGS. 11-13, the webbing 500 may be pushed through the central slot such that the breakaway accessory keeper 400 may be attached at any point on the webbing 500 without the need to detach and thread the webbing 500 through the breakaway accessory keeper 400.

The loop 408 extends from one end of the base 406 and the notch 402 is formed in an opposite end of the base 402. A distal end of the loop 408 includes the hook 410. The hook 410 and notch 402 have corresponding shapes such that the hook 410 may releasably attach to the notch 402. FIGS. 11-13 show the hook 410 attached to the notch 402. As shown in FIGS. 11-13, the loop 408 forms a roughly round shape. Accessories such as, without limitation, tools, lanyards, self-retracting lifeline devices, or other object may be attached to the loop 408.

In the event that an object attached to the loop 408 is pulled on with sufficient force, such as when the object becomes snagged, the hook 410 will release from the notch 402, and the object will be released. The hook 410 can then be re-attached to the notch 402, making the breakaway accessory keeper 400 reusable after a breakaway event.

While the hook 410 and notch 402 are one example of a breakaway attachment for the breakaway accessory keeper 400, it will be appreciated that other breakaway attachments may be employed without departing from the scope of the disclosed concept. In one example embodiment, the loop may have a tapered head and the base may have a hole to receive the tapered head. Under sufficient force, the tapered head will pull through the hole to release the loop. This example embodiment also provides a reusable breakaway functionality. In one example embodiment, the loop and base may have corresponding snap fit features, such as a tab and opening or indent. For example, the base may have an opening in which a tab is disposed and the loop may have an opening that corresponds to the tab. Inserting the loop into the base will cause the opening in the loop to snap onto the tab, thus holding the loop in place. Pulling on the loop with sufficient force will cause the loop to release. A stop rib may also be included on the loop to prevent the loop from being inserted further into the opening in the base than intended. It will be appreciated that other variations may also be used.

Figure 14:
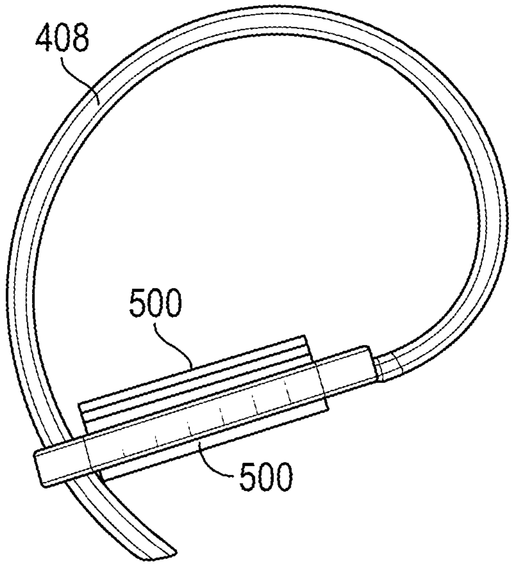
Figure 15:
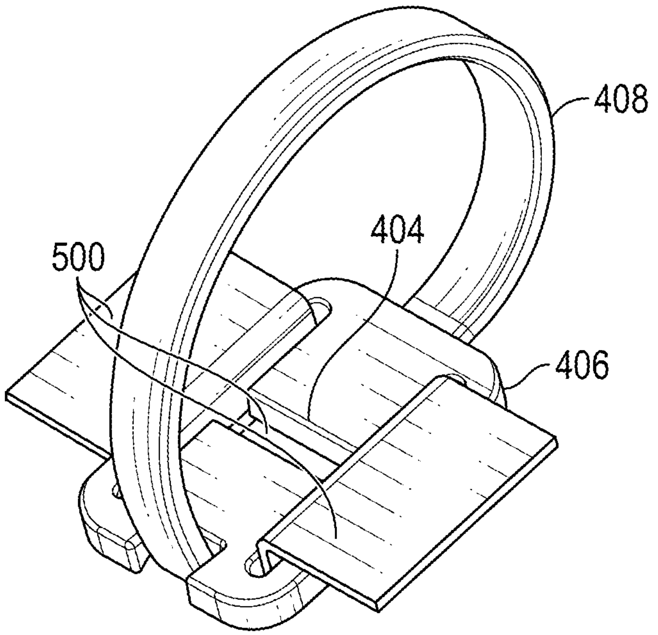
Figure 16:
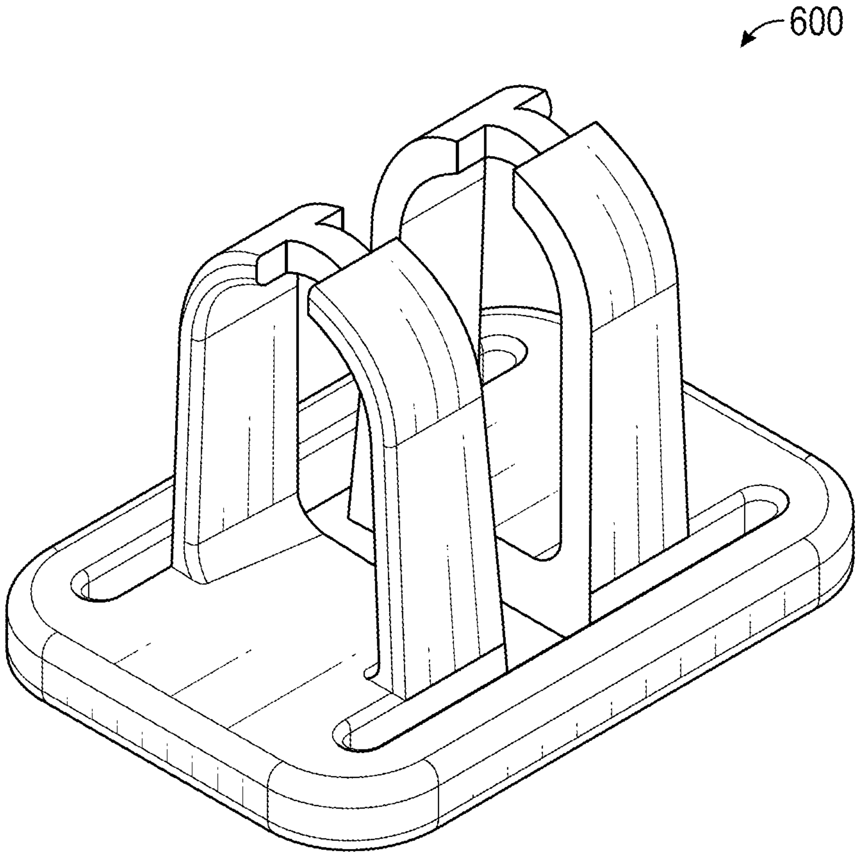
FIG. 16 is a view of a breakaway accessory keeper in accordance with another example embodiment of the disclosed concept.
Figure 17:
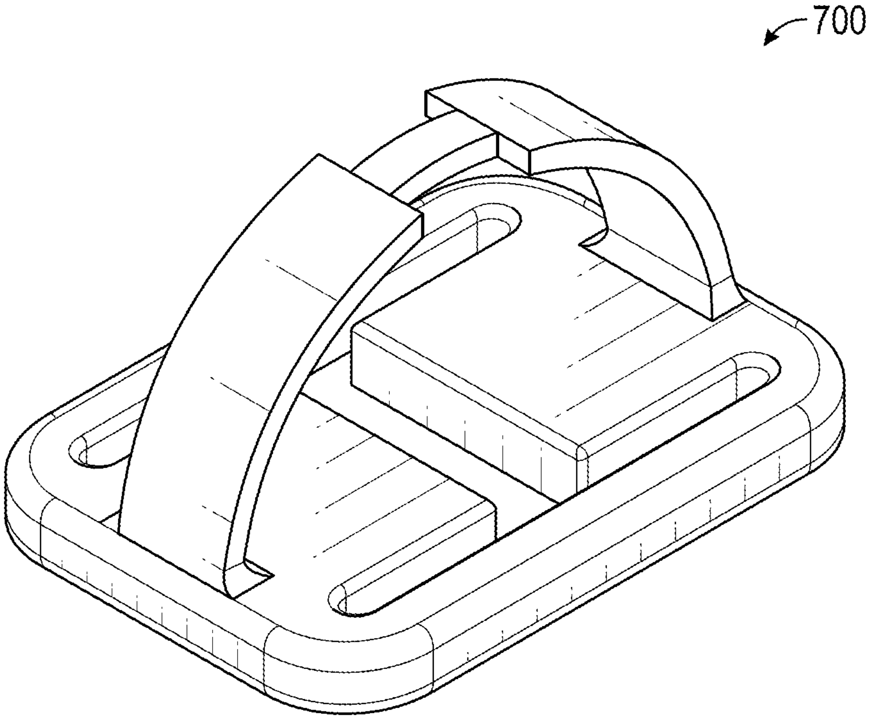
FIG. 17 is a view of a breakaway accessory keeper in accordance with another example embodiment of the disclosed concept.
Figure 18:
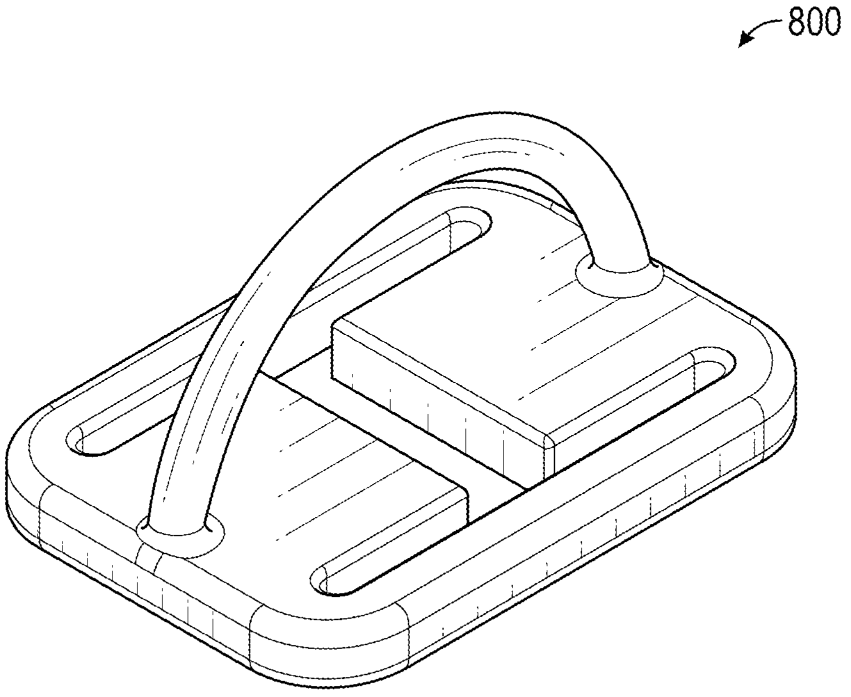
FIG. 18 is a view of a breakaway accessory keeper in accordance with another example embodiment of the disclosed concept.

FIGS. 14-16 are views of additional example embodiments of breakaway accessory keepers 600,700,800. These example embodiments also include a based with an H-shaped slotted opening for attachment at any point on the webbing. The example embodiments have different variations of arched openings for attachment to webbing. Each of these embodiments is not reuseable and is intended to be discarded if a breakaway occurs. These embodiments depend on the arched loop having built in weakness to provide the breakaway function. FIG. 14 shows a keeper having two loops to which two accessories may be attached.

The narrow necked down section of the loop is sized to break when the maximum allowed force is applied to the accessory. FIG. 15 shows a keeper having a single loop. The single loop has a necked down section which breaks at the maximum allowed force. FIG. 16 shows a keeper having a single loop. In this embodiment the loop cross section is sized to break at any location along the arch when the maximum allowed force is applied to the accessory.

It will be appreciated that any of the breakaway accessory keepers shown and described in association with FIGS. 10-16 may be used in conjunction with the harness 10 shown in FIGS. 1 and 2 and the self-retracting lifeline 100. For example, as shown in FIGS. 1 and 2, a breakaway accessory keeper is attached to the harness 10 at the hip of the user, and the self-retracting lifeline 100 is attached to the breakaway accessory keeper while not in use.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A self-retracting lifeline system comprising:

a self-retracting lifeline including a retracting device and webbing extending from the retracting device;

a backpack energy absorber configured to attach to a harness configured to be worn by a user; and a breakaway accessory keeper including a base having an H-shaped slotted opening and a loop having a first end attached to the base and a second end structured to releasably attach to the base, wherein the webbing includes a first end attached to the retracting device and a second end attached to the backpack energy absorber, wherein the webbing has a length sufficient such that the retracting device is configured to reach a hip of the user wearing the harness while the webbing is attached to the backpack energy absorber, and wherein the breakaway accessory keeper is structured to attach to the harness at the hip of the user and the retracting device is configured to attach to the breakaway accessory keeper.

2. The self-retracting lifeline system of claim 1, wherein the second end of the webbing is attached to the backpack energy absorber via a stitched loop formed in the webbing.

3. The self-retracting lifeline system of claim 1, wherein the self-retracting lifeline includes:

an attachment hook assembly configured to attach to an attachment point;

a frame; and a ball and socket type joint configured to attach the frame to the attachment hook assembly and to allow the frame to move angularly and rotationally with respect to the attachment hook assembly, wherein the retracting device is disposed within the frame and is configured to accommodate a length of the webbing and automatically retract the webbing.

4. The self-retracting lifeline system of claim 3, wherein the ball and socket type joint comprises:

a cover; and a ball end, wherein a portion of the attachment hook assembly extends through the cover into the frame, and wherein the ball end is disposed proximate the frame.

5. The self-retracting lifeline system of claim 3, wherein the ball and socket type joint is configured to allow the frame to move angularly up to 20 degrees with respect to the attachment hook assembly.

6. The self-retracting lifeline system of claim 1, wherein the self-retracting lifeline is a first self-retracting lifeline, the retracting device is a first retracting device, and the webbing is a first webbing, the self-retracting lifeline system further comprising:

a second self-retracting lifeline including a second retracting device; and second webbing extending from the second self-retracting lifeline, wherein the second webbing includes a first end attached to the second self-retracting lifeline and a second end attached to the backpack energy absorber.

7. A self-retracting lifeline system comprising:

a self-retracting lifeline including a retracting device and webbing extending from the retracting device; and a breakaway accessory keeper including a base having an H-shaped slotted opening and a loop having a first end attached to the base and a second end structured to releasably attach to the base, wherein the webbing includes a first end attached to the retracting device and a second end configured to couple to a harness configured to be worn by a user, wherein the webbing has a length sufficient such that the retracting device is configured to reach a hip of the user while the webbing is coupled to the harness, and wherein the breakaway accessory keeper is structured to attach to the harness at the hip of the user and the retracting device is configured to attach to the breakaway accessory keeper.

8. The self-retracting lifeline system of claim 7, wherein the second end of the webbing is coupled to the harness via a stitched loop formed in the webbing.

9. The self-retracting lifeline system of claim 7, wherein the self-retracting lifeline includes:

an attachment hook assembly configured to attach to an attachment point;

a frame; and a ball and socket type joint configured to attach the frame to the attachment hook assembly and to allow the frame to move angularly and rotationally with respect to the attachment hook assembly, wherein the retracting device is disposed within the frame and is configured to accommodate a length of the webbing and automatically retract the webbing.

10. The self-retracting lifeline system of claim 9, wherein the ball and socket type joint comprises:

a cover; and a ball end, wherein a portion of the attachment hook assembly extends through the cover into the frame, and wherein the ball end is disposed proximate the frame.

11. The self-retracting lifeline system of claim 9, wherein the ball and socket type joint is configured to allow the frame to move angularly up to 20 degrees with respect to the attachment hook assembly.

12. A self-retracting lifeline system comprising:

a harness configured to be worn by a user;

a self-retracting lifeline including a retracting device and webbing extending from the retracting device;

a backpack energy absorber attached to a back of the harness; and a breakaway accessory keeper including a base having an H-shaped slotted opening and a loop having a first end attached to the base and a second end structured to releasably attach to the base, wherein the webbing includes a first end attached to the retracting device and a second end attached to the backpack energy absorber, wherein the webbing has a length sufficient such that the retracting device is configured to reach a hip of the user wearing the harness while the webbing is attached to the backpack energy absorber, and wherein the breakaway accessory keeper is structured to attach to the harness at the hip of the user and the retracting device is configured to attach to the breakaway accessory keeper.

13. The self-retracting lifeline system of claim 12, wherein the second end of the webbing is attached to the backpack energy absorber via a stitched loop formed in the webbing.

14. The self-retracting lifeline system of claim 12, wherein the self-retracting lifeline includes:

an attachment hook assembly configured to attach to an attachment point;

a frame; and a ball and socket type joint configured to attach the frame to the attachment hook assembly and to allow the frame to move angularly and rotationally with respect to the attachment hook assembly, wherein the retracting device is disposed within the frame and is configured to accommodate a length of the webbing and automatically retract the webbing.

15. The self-retracting lifeline system of claim 14, wherein the ball and socket type joint comprises:

a cover; and a ball end, wherein a portion of the attachment hook assembly extends through the cover into the frame, and wherein the ball end is disposed proximate the frame.

16. The self-retracting lifeline system of claim 12, wherein the self-retracting lifeline is a first self-retracting lifeline, the retracting device is a first retracting device, and the webbing is a first webbing, the self-retracting lifeline system further comprising:

a second self-retracting lifeline including a second retracting device; and second webbing extending from the second retracting device, wherein the second webbing includes a first end attached to the second self-retracting lifeline and a second end attached to the backpack energy absorber.

* * * * *